(12) United States Patent
Wood et al.

(10) Patent No.: US 9,117,083 B2
(45) Date of Patent: Aug. 25, 2015

(54) MANAGING BOOTING OF SECURE DEVICES WITH UNTRUSTED SOFTWARE

(75) Inventors: Robert Henderson Wood, Waterloo (CA); Roger Paul Bowman, Kitchener (CA); Oliver Whitehouse, Belmont (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/026,968

(22) Filed: Feb. 14, 2011

(65) Prior Publication Data

US 2012/0210113 A1    Aug. 16, 2012

(51) Int. Cl.
*G06F 11/30* (2006.01)
*G06F 21/57* (2013.01)

(52) U.S. Cl.
CPC ...... *G06F 21/575* (2013.01); *G06F 2221/2105* (2013.01)

(58) Field of Classification Search
CPC ......... G06F 21/00; G06F 21/10; G06F 21/51; G06F 2121/0735; G06F 2121/2149; G06F 21/57; G06F 21/53; G06F 21/74; G06F 9/4406; G06F 9/441; G06F 2221/2149; H04L 67/34
See application file for complete search history.

(56) References Cited

U.S. PATENT DOCUMENTS

| | | | |
|---|---|---|---|
| 6,327,652 B1 * | 12/2001 | England et al. | 713/2 |
| 7,237,031 B2 | 6/2007 | Cheng | |
| 7,237,081 B2 * | 6/2007 | Dahan et al. | 711/163 |
| 7,873,830 B2 * | 1/2011 | Fayad et al. | 713/169 |
| 8,117,367 B2 * | 2/2012 | Conti et al. | 710/261 |
| 2002/0019941 A1 * | 2/2002 | Chan et al. | 713/185 |
| 2002/0188763 A1 * | 12/2002 | Griffin | 709/310 |
| 2003/0177371 A1 * | 9/2003 | Rothrock et al. | 713/189 |

(Continued)

FOREIGN PATENT DOCUMENTS

WO    2010121020 A1    10/2010

OTHER PUBLICATIONS

"JEDEC Standard, Embededed MultiMediaCard(e MMC) e MMC/ Card Product Standard, High Capacity, including Reliable Write, Boot, Sleep Modes, Dual Data Rate, Multiple Partitions Supports, Security Enhancement, Background Operation and High Priority Interrupt (MMCA, 4.41)," JEDEC Solid State Technology Association 2010; Arlington, VA, US.

Extended European Search report mailed Mar. 8, 2013, in corresponding European patent application No. 11154503.4.

(Continued)

*Primary Examiner* — Farid Homayounmehr
*Assistant Examiner* — Lizbeth Torres-Diaz
(74) *Attorney, Agent, or Firm* — Fish & Richardson P.C.

(57) ABSTRACT

Normally, at the time of manufacturing, security may be provided to a device being manufactured through the loading of an operating system that has been cryptographically signed. The present application discloses a "factory mode" for the device. The "factory mode" allows the device to execute untrusted operating system code, such as unsigned operating system code and operating system code that has been signed, but the certificate authority is not trusted. To support execution of untrusted operating system code in a secure manner, the device may be adapted to prevent data of predetermined type from being loaded on the device while the device is in the "factory mode". In contrast to the "factory mode", the secure mode of the device is referred to herein as a "product mode". There develops a need to manage, in a secure manner, transitions between the "product mode" and the "factory mode".

25 Claims, 4 Drawing Sheets

(56) References Cited

U.S. PATENT DOCUMENTS

| | | | |
|---|---|---|---|
| 2005/0033969 A1* | 2/2005 | Kiiveri et al. | 713/189 |
| 2008/0052534 A1* | 2/2008 | Harada et al. | 713/190 |
| 2008/0165971 A1* | 7/2008 | de Cesare et al. | 380/277 |
| 2010/0058053 A1* | 3/2010 | Wood et al. | 713/155 |
| 2010/0095125 A1* | 4/2010 | Srinivasan et al. | 713/175 |
| 2011/0099361 A1* | 4/2011 | Shah et al. | 713/2 |

OTHER PUBLICATIONS

Canadian Intellectual Property Office, "Requisition by the Examiner in Accordance with Subsection 30(2) of the Patent Rules" dated Sep. 29, 2014.

Extended European Search Report for application No. 11154503.4 dated Mar. 8, 2013.

Office Action mailed Sep. 29, 2014; in Canadian patent application No. 2,767,574.

* cited by examiner

MANAGING BOOTING OF SECURE DEVICES WITH UNTRUSTED SOFTWARE

FIELD

The present application relates generally to managing booting of secure devices and, more specifically, to managing booting of secure devices with untrusted software.

BACKGROUND

An entity we refer to herein as an Original Equipment Manufacturer (OEM) that is involved in the design and eventual marketing and sales of a given device may hire a third party to manufacture the given device. Along with a list of hardware materials to assemble along with assembly instructions, the OEM may provide the third party (manufacturer) with software to be loaded on the given device during manufacturing. More particularly, the OEM may provide the manufacturer with a secondary boot loader and an OEM operating system.

One manner in which the security of a device my be enhanced, that is, to ensure that the operating system executed on a given device is an operating system intended to be executed on the given device, is to cryptographically sign the OEM operating system. To cryptographically sign an operating system, a code signing server may, first, utilize the code of the operating system as input to a hash function to obtain a digital signature. SHA-512 is a hash algorithm designed by the United States National Security Agency (NSA) and published by the United States National Institute of Standards and Technology (NIST) in Federal Information Processing Standards (FIPS) PUB 180-2. Subsequently, the code signing server may encode the digital signature using a code signing private key. The code signing server may then append the encoded digital signature, which may be called a cryptographic signature or cryptographic identifier ("ID"), to the operating system code.

During manufacture, the OEM operating system is loaded onto the given device. During the boot sequence, the secondary boot loader may obtain the code of the operating system and a cryptographic ID that is associated with the OEM operating system. The secondary boot loader may provide the code of the OEM operating system as input to the same hash function used by the code signing server. As a result of providing the OEM operating system code to the hash function, the secondary boot loader receives a local digital signature as the output of the hash function. The secondary boot loader then decodes the encoded digital signature associated with the OEM operating system with the code signing public key. The OEM operating system may be considered to be authenticated if the secondary boot loader finds that the decoded digital signature is a match for the local digital signature. Upon determining that decoded digital signature is a match for the local digital signature, then the secondary boot loader allows the processor to execute the OEM operating system. If the secondary boot loader fails to find a match between the decoded digital signature and the local digital signature, then the secondary boot loader denies the processor the ability to execute the OEM operating system.

BRIEF DESCRIPTION OF THE DRAWINGS

Reference will now be made, by way of example, to the accompanying drawings which show example implementations; and in which.

DETAILED DESCRIPTION

Figure 1:
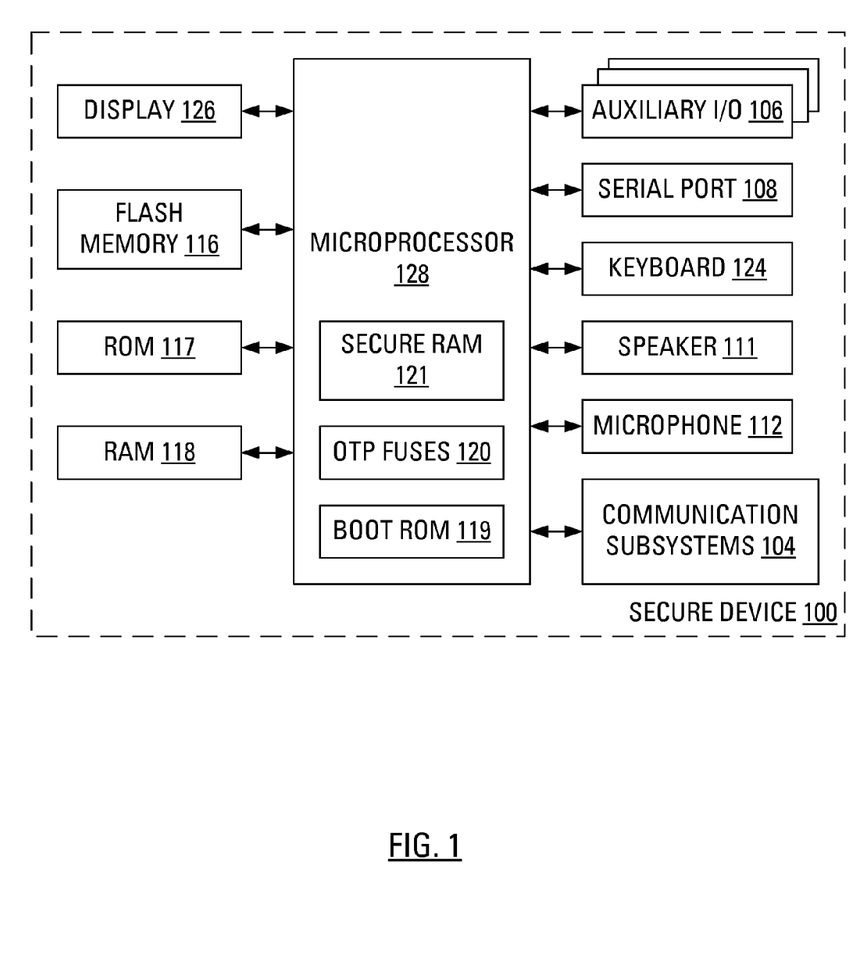
FIG. 1 illustrates, in a schematic view, components of a secure device.

FIG. 1 illustrates a secure device 100 as an example of a device that may carry out a method illustrative of the present application. The secure device 100 may, for example, include a housing, an input device (e.g., a keyboard 124 having a plurality of keys) and an output device (e.g., a display 126), which may comprise a full graphic, or full color, Liquid Crystal Display (LCD). In some embodiments, the display 126 may comprise a touchscreen display. In such embodiments, the keyboard 124 may comprise a virtual keyboard. Other types of output devices may alternatively be utilized. A processing device (a microprocessor 128) is shown schematically in FIG. 1 as coupled between the keyboard 124 and the display 126. The microprocessor 128 controls the operation of the display 126, as well as the overall operation of the secure device 100, in part, responsive to actuation of the keys on the keyboard 124 by a user.

The housing may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

In addition to the microprocessor 128, other parts of the secure device 100 are shown schematically in FIG. 1. These may include a collection of communications subsystems 104, which may include both short-range communications subsystems and long-range communications subsystems. The secure device 100 may further include other input/output devices, such as a set of auxiliary I/O devices 106, a serial port 108, a speaker 111 and a microphone 112. The secure device 100 may further include memory devices including a flash memory 116, a Read-Only Memory (ROM) 117 and a Random Access Memory (RAM) 118. Memory devices may also be included in the design of the microprocessor 128. For example, the microprocessor 128 may include a boot ROM 119, one or more one time programmable (OTP) fuses 120 and a secure RAM 121.

Notably, the flash memory 116 may be implemented as an embedded Multi Media Card (eMMC). A published eMMC standard describes an architecture consisting of an embedded storage solution with an MMC interface, flash memory and a controller [see JEDEC, "Embedded Multi Media Card (eMMC) eMMC/Card Product Standard, High Capacity, including Reliable Write, Boot, Sleep Modes, Dual Data Rate, Multiple Partitions Supports, Security Enhancement, Background Operation and High Priority Interrupt (MMCA, 4.41)", JESD84-A441, March 2010]. Conveniently, an eMMC-implemented flash memory 116 may include a relay protected memory block (RPMB).

The secure device 100 may comprise a two-way radio frequency (RF) communication device having voice and data communication capabilities. In addition, the secure device 100 may have the capability to communicate with other computer systems via the Internet.

Operating system software executed by the microprocessor 128 may be stored in a computer readable medium, such as the flash memory 116, but may be stored in other types of memory devices, such as the ROM 117 or similar storage element. In addition, system software, specific device applications, or parts thereof, may be temporarily loaded into a volatile store, such as the RAM 118. Communication signals received by the mobile device may also be stored to the RAM 118.

As discussed hereinbefore, memory for the processor 128 may be, in part, implemented as a bank holding a plurality of OTP fuses 120. Configuration settings for the OTP fuses 120 may be stored in the flash memory 116.

The microprocessor 128, in addition to its operating system functions, enables execution of software applications on the secure device 100. A predetermined set of software applications that control basic device operations, such as a voice communications module and a data communications module, may be installed on the secure device 100 during manufacture. As well, additional software modules, illustrated as another software module, which may be, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, are performed through the communication subsystems 104. The communication subsystems 104 may include a receiver, a transmitter and one or more antennas. In addition, the communication subsystems 104 may also includes a processing module, such as a digital signal processor (DSP) and local oscillators (LOs). The specific design and implementation of the communication subsystems 104 are dependent upon the communication network in which the secure device 100 is intended to operate. For example, the communication subsystems 104 of the secure device 100 may include a communication subsystem designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), Worldwide Interoperability for Microwave Access (WiMAX), etc. Other types of data and voice networks, both separate and integrated, may also be utilized with the secure device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

A short-range communications subsystem, among the communication subsystems, may enable communication between the secure device 100 and other proximate systems or devices, which need not necessarily be similar devices. For example, such a short-range communications subsystem may include an infrared device and associated circuits and components, or a Bluetooth™ communication module to provide for communication with similarly-enabled systems and devices.

In computing, booting generally refers to a process that initiates the execution of an operating system responsive to the turning on of a computing device. A "boot sequence" generally includes an initial set of operations that the computing device performs when power is switched on. A "boot loader" generally includes software code that defines the boot sequence and, when executed, directs a processor to load a main operating system for the computing device.

As part of the manufacturing process, the contract manufacturer, under instructions from the OEM, may store provisioning data in the memory 116, 117, 118 of the secure device 100. Such provisioning data may include proprietary or public device identification and one or more authentication keys. Furthermore, the provisioning data may be digitally signed in an attempt to prevent device cloning and after market modification.

In the case wherein the flash memory 116 is implemented as an eMMC, the flash memory 116 may include an RPMB. A secret, processor-specific value may be injected into the RPMB during provisioning. Furthermore, the same processor-specific value may be digitally signed to discourage tampering with the RPMB. Furthermore, an OTP fuse in the processor may be burnt to indicate the provisioning operation has been completed. Such an indication may serve to discourage memory replacement.

It has been determined that, in some situations, it may be advantageous to allow the secure device 100 to execute an operating system that has not been signed or an operating system that has been signed, but not signed by an entity trusted by the OEM. Allowing a $3^{rd}$ party manufacturer to load their own operating system code allows the manufacturer the freedom to streamline the manufacturing process in whatever manner the manufacturer sees fit. This freedom, in turn, may reduce costs. If the OEM were to require the manufacturer's code to be signed by an entity trusted by the OEM, then the OEM would need to be involved in the development process of the manufacturer's code (at minimum from a design and security review perspective) and such involvement may be seen to put a load on OEM development teams. If the manufacturer's code is unsigned or signed by an entity other than an entity trusted by the OEM, then the OEM need not be involved in any significant way in the manufacturing process, thereby further reducing complexity and/or cost.

The present application provides a "factory mode" for the secure device 100. The "factory mode" allows the secure device 100 to execute unsigned operating system code or operating system code signed by an entity other than an entity trusted by the OEM, collectively referred to herein as "untrusted" software. To support execution of untrusted operating system code in a secure manner, the secure device 100 may be adapted to prevent data of predetermined type from being loaded on the secure device 100 while the secure device 100 is in the "factory mode". In contrast to the "factory mode", the secure mode of the secure device 100 is referred to herein as a "product mode". There develops a need to manage, in a secure manner, transitions between the "product mode" and the "factory mode".

According to an aspect of the present disclosure, there is provided a method of executing an untrusted operating system on a device having hardware resources (such as memory, cryptographic hardware, OTP fuses, secret keys, or a dedicated security processor) designated as a security block. The method comprises loading an operating system, determining that said operating system has not been signed by a trusted entity, determining that said device is in a first operational mode, said first operational mode allowing execution of unsigned operating systems, responsive to determining that said device is in said first operational mode, disabling operating system access to said security block and executing said operating system. In other aspects of the present application, a secure device is provided for carrying out this method and a computer readable medium is provided for adapting a processor in a secure device to carry out this method.

Notably, the term "first" is not used herein to imply temporal precedence. Instead, the term first is used herein to distinguish one operational mode from another, distinct, operational mode.

Other aspects and features of the present disclosure will become apparent to those of ordinary skill in the art upon review of the following description of specific implementations of the disclosure in conjunction with the accompanying figures.

Figure 2:
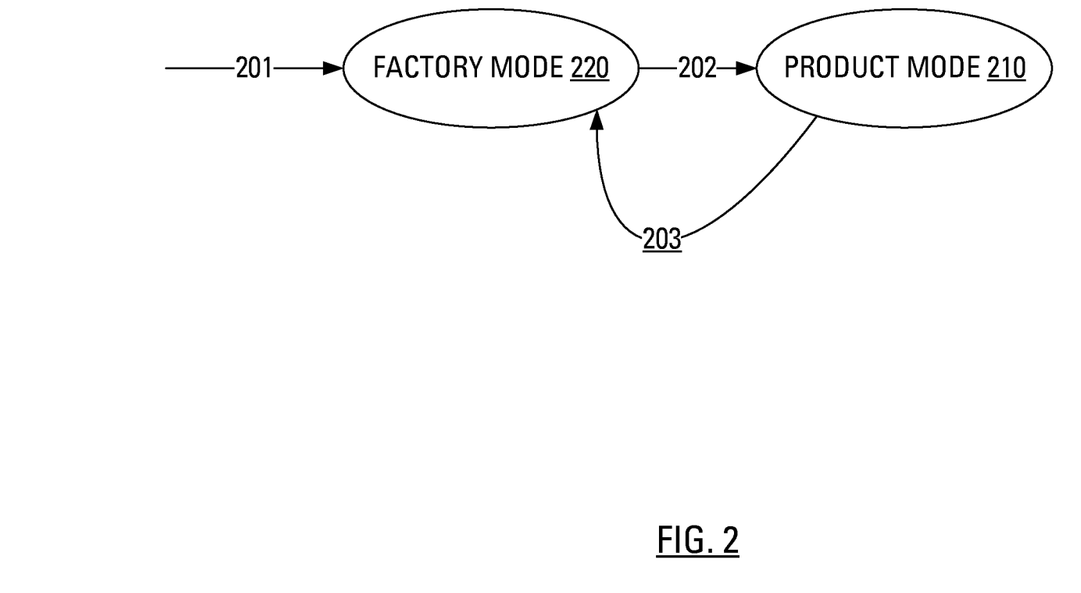
FIG. 2 illustrates a mode-state diagram for the secure device of FIG. 1.

In view of a mode-state diagram presented in FIG. 2, it is disclosed herein to establish two operational modes for a secure device: a "product" mode 210; and a "factory" mode 220. When initially manufactured, the secure device 100 may perform a first transition 201 into the factory mode 220 from an unprovisioned state. More particularly, the microprocessor 128 may execute transition tools to, among other activities, store, in the RPMB, an indication that the secure device is in factory mode 220. When the factory mode 220 is no longer required, the secure device 100 may be manipulated to cause the microprocessor 128 to execute the transition tools to perform a second transition 202 into the product mode 210. The microprocessor 128 may then store, in the RPMB, an indication that the secure device is in product mode 210. RPMB is one example of secure persistent storage. Other secure persistent storage may be substituted.

Once established in the product mode 210, the secure device 100 may be manipulated to cause the microprocessor 128 to execute the transition tools to perform a third transition 203 back into the factory mode 220. Indeed, the transitions have been referred to by ordinals for ease of description of FIG. 2. It should be clear that any number of transitions between modes 210, 220 may be allowed.

Figure 3:
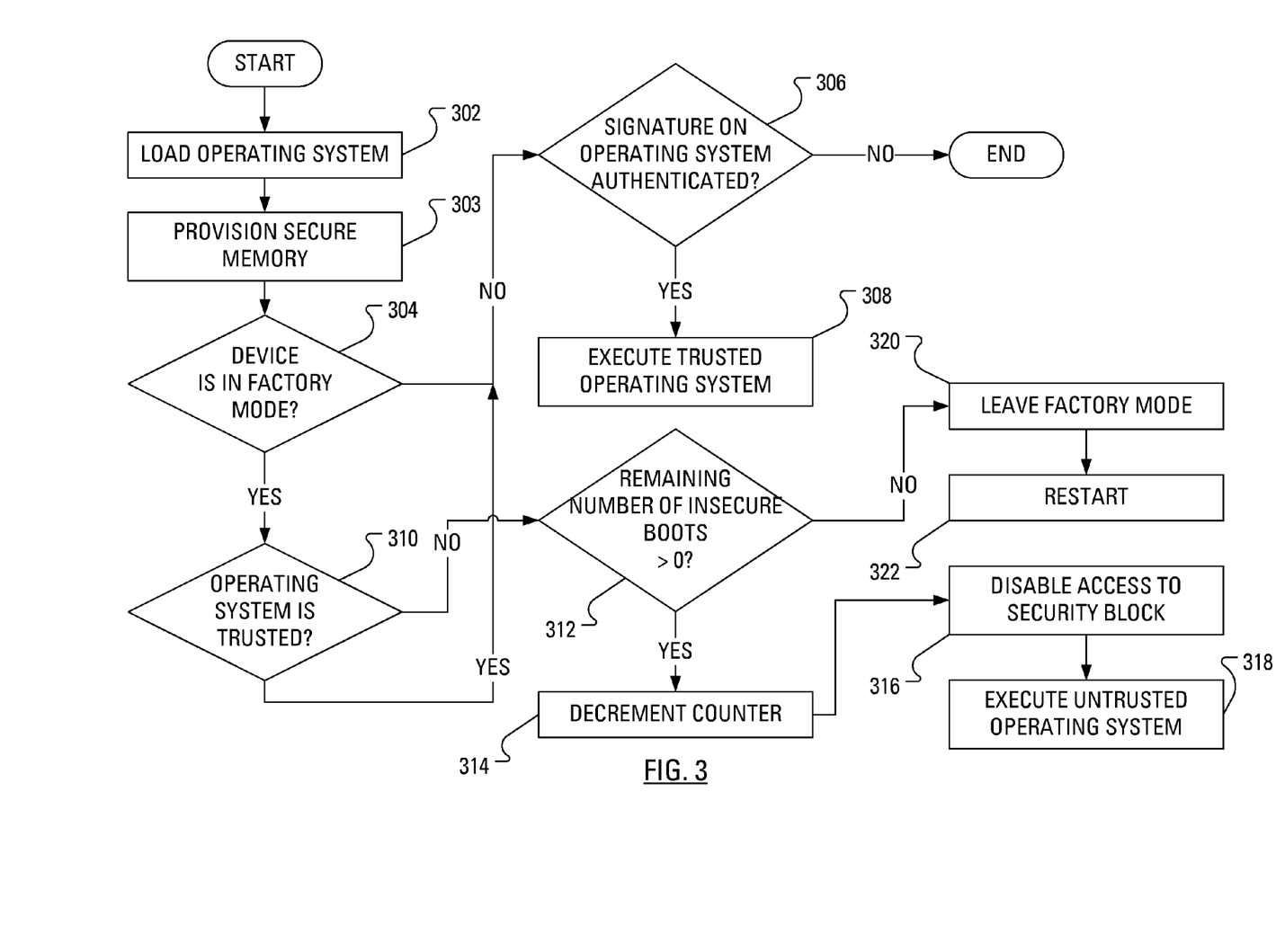
FIG. 3 illustrates example steps in a method of executing an operating system in the secure device of FIG. 1.

FIG. 3 illustrates example steps in a method of executing an operating system. Initially, the processor 128, executing a boot loader from the boot ROM 119, loads (step 302) the operating system. In a case wherein the secure device 100 is exiting an unprovisioned state, the processor 128 may provision (step 303) secure memory. The secure memory may, for example, include a range of storage locations in the flash memory 116.

Figure 4:
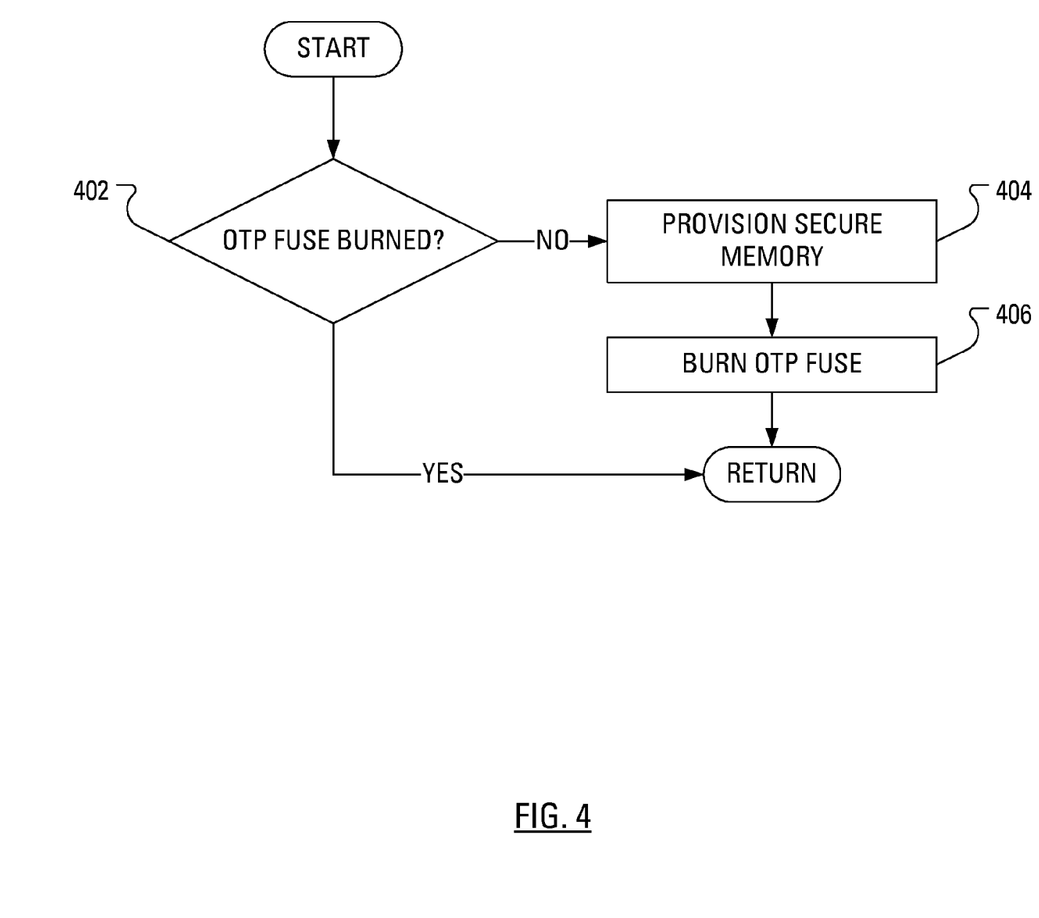
FIG. 4 illustrates example steps in a method of handling provisioning of secure memory in the secure device of FIG. 1.

FIG. 4 illustrates example steps in a method of handling provisioning of secure memory in the secure device 100.

Initially, the processor 128 determines (step 402) whether one or more of the OTP fuses 120 have been burned to indicate that the secure memory has already been provisioned. Upon determining that the secure memory has not already been provisioned, the processor 128 provisions (step 404) the secure memory.

Provisioning the secure memory may comprise generating a unique, device-specific authentication key, programming the authentication key into the secure memory and initializing data structures within the secure memory to initial, default values.

After provisioning (step 404) the secure memory, the processor 128 may burn (step 406) one or more of the OTP fuses 120 to indicate that the secure memory has been provisioned.

After having burned (step 406) one or more of the OTP fuses 120, or upon determining (step 402) that the secure memory has already been provisioned, the processor 128 then determines (step 304, FIG. 3) whether the factory mode has been activated. In particular, the processor 128 may, for example, access the location in the RPMB where the indication of mode has been previously stored.

Upon determining (step 304) that the secure device 100 is not in factory mode, i.e., determining that the secure device 100 is in product mode, the processor 128 determines (step 306) whether the operating system may be authenticated.

If the security handler fails to authenticate the signature on the operating system, then the security handler denies the processor 128 the ability to execute the operating system.

Upon determining (step 304) that the secure device 100 is in factory mode, the processor 128 determines (step 310) whether the operating system is trusted. An operating system may be considered trusted if, for example, the operating system is associated with an encoded digital signature that identifies a certificate authority that is trusted by the OEM. Upon determining (step 310) that the operating system is trusted, the processor 128 determines (step 306) whether the operating system may be authenticated. Upon authenticating (step 306) the operating system, then the security handler allows the processor to execute (step 308) the operating system. If the security handler fails to authenticate the operating system, then the security handler denies the processor the ability to execute the operating system.

Upon determining (step 310) that the operating system is not trusted, the processor 128 determines (step 312) whether a counter of allowed insecure boots exceeds zero. Upon determining (step 312) that the counter of allowed insecure boots exceeds zero, the processor 128 decrements (step 314) the counter of allowed insecure boots. The processor 128 then disables (step 316) access to the security block. Once access to the security block has been appropriately disabled, the processor 128 proceeds to execute (step 318) the untrusted operating system.

Notably, the untrusted operating system may be signed or unsigned. In the case wherein the untrusted operating system has been signed with a digital signature that identifies a certificate authority that is not among a set of certificate authorities trusted by the OEM, execution (step 318) of the untrusted operating system may involve authenticating (not specifically shown in FIG. 3) the signature before allowing the untrusted operating system to be executed by the processor 128.

Access to the security block may include access to storage containing a device-specific cryptographic key such as, for example, specific memory ranges or the OTP fuses 120. The specific memory ranges could be anywhere among the flash memory 116, the ROM 117, the RAM 118 and the secure RAM 121. Furthermore, the specific memory ranges could include memory-mapped hardware resources that are not memory, such as, for example, the OTP fuses 120 or a cryptography module (not shown).

Disabling (step 316) access to such a device-specific cryptographic key makes it impossible for an untrusted operating system to access any data protected with the device-specific cryptographic key (such as data contained in the RPMB of the flash memory 116).

The security block may, for example, store device provisioning data.

The security block may, for example, store authentication keys.

Upon determining (step 312) that the counter of allowed insecure boots has reached zero, the processor 128 deactivates (step 320) the factory mode 220 and restarts (step 322) in order to safely exit the factory mode 220.

During the course of use in the product mode 210, there may be a reason to change the mode of operating into the factory mode 220. This mode change may accomplished by the use of external tools containing signed code. Such tools would have the capability to upload this signed code and cause this signed code to be executed on the processor 128 by the OEM boot loader. Upon execution, this signed code would securely restore the secure device 100 to the factory mode 220 after ensuring that all sensitive data has been erased from the device memories 116, 117, 118.

It should be noted that in the product mode 210, the secure device 100 will generally have stored some user-specific data and added some cryptographic keys to a key store in the memories 116, 118. Accordingly, disabling (step 316) access to the security block maintains security for user data and cryptographic keys when the user data and key store have been saved in or protected by the security block.

In the case wherein user data is not stored in or protected by the security block, disabling (step 316) access to the security block may be further enhanced by erasing (not shown) all user data from the memory 116, 118.

As the OEM boot loader discussed herein is executed, by the processor 128, security of the secure device 100 may be enhanced by write protecting the memory containing the OEM boot loader.

Conveniently, booting the secure device 100 with an unsigned operating system may be shown to occur faster than booting the secure device 100 with a signed operating system.

Further conveniently, aspects of the present application provide greater flexibility for the device firmware that is used in the factory. Development changes to untrusted code need not be tested on production units or go through time consuming formal build and release processes.

The above-described implementations of the present application are intended to be examples only. Alterations, modifications and variations may be effected to the particular implementations by those skilled in the art without departing from the scope of the application, which is defined by the claims appended hereto.

What is claimed is:

1. On a device having a collection of hardware resources designated as a security block, a method of executing an untrusted operating system, said method comprising:
    performing a transition from an unprovisioned state into a first operational mode, said first operational mode allowing execution of untrusted operating systems;
    storing an indication that said device is in said first operational mode;
    loading said untrusted operating system;
    subsequent to said loading, determining that said untrusted operating system has not been signed by a trusted entity;
    subsequent to said loading, determining, upon review of said indication, that said device is in said first operational mode;
    responsive to determining that said device is in said first operational mode, determining that a counter of allowed insecure boots exceeds zero;
    responsive to the determining that the counter exceeds zero:
    decrementing the counter of allowed insecure boots;
    disabling untrusted operating system access to said security block; and
    executing said untrusted operating system;
    responsive to the determining that the counter equals zero:
    deactivate said first operational mode; and
    restart the device.

2. The method of claim 1 wherein said security block stores processor fuse settings.

3. The method of claim 1 wherein said security block stores device provisioning data.

4. The method of claim 1 wherein said security block stores authentication keys.

5. The method of claim 1 further comprising erasing stored user data.

6. A secure device comprising:
    a security block; and
    a processor adapted to:
    perform a transition from an unprovisioned state into a first operational mode, said first operational mode allowing execution of untrusted operating systems;
    store an indication that said device is in said first operational mode;
    load an untrusted operating system;
    determine, subsequent to said loading, that said untrusted operating system has not been signed by a trusted entity;
    determine, subsequent to said loading and upon review of said indication, that said device is in said first operational mode;
    determine that a counter of allowed insecure boots exceeds zero;
    decrement the counter of allowed insecure boots;
    disable untrusted operating system access to said security block;
    execute said untrusted operating system;
    determine that the counter of allowed insecure boots equals zero;
    deactivate said first operational mode; and
    restart the secure device.

7. The secure device of claim 6 further comprising a write-protected read only memory storing a boot loader.

8. The secure device of claim 6 wherein said memory comprises embedded multi media card memory.

9. The secure device of claim 8 wherein said security block comprises secure persistent storage.

10. The secure device of claim 9 wherein said secure persistent storage comprises a relay protected memory block.

11. The secure device of claim 6 wherein said security block stores processor fuse settings.

12. The secure device of claim 6 wherein said security block stores a device specific cryptographic key.

13. The secure device of claim 6 wherein said security block stores device provisioning data.

14. The secure device of claim 6 wherein said processor is adapted to erase stored user data.

15. The secure device of claim 6 wherein said security block stores an authentication key.

16. The secure device of claim 6 further comprising a write-protected read only memory storing a boot loader and wherein the processor is further adapted to:
load said boot loader; and
under instructions from said boot loader, load said operating system.

17. A non-transitory computer readable medium containing computer-executable instructions that, when performed by a processor in a secure device, wherein the secure device includes a security block, cause said processor to:
perform a transition from an unprovisioned state into a first operational mode, said first operational mode allowing execution of untrusted operating systems;
store an indication that said device is in said first operational mode;
load an untrusted operating system;
determine, subsequent to said loading, that said untrusted operating system has not been signed by a trusted entity;
determine, subsequent to said loading and upon review of said indication, that said device is in said first operational mode;
determine that a counter of allowed insecure boots exceeds zero;
decrement the counter of allowed insecure boots;
disable untrusted operating system access to said security block; and
execute said untrusted operating system;
determine that the counter of allowed insecure boots equals zero;
deactivate said first operational mode; and
restart the secure device.

18. The computer readable medium of claim 17 wherein said security block stores processor fuse settings.

19. The computer readable medium of claim 17 wherein said security block stores a device-specific cryptographic key.

20. The computer readable medium of claim 17 wherein said security block stores a relay protected memory block.

21. The computer readable medium of claim 17 wherein said security block stores device provisioning data.

22. The computer readable medium of claim 17 wherein said computer executable instructions cause said processor to erase stored user data.

23. The computer readable medium of claim 17 wherein said security block stores an authentication key.

24. The method of claim 1 wherein the untrusted operating system comprises an unsigned operating system.

25. The method of claim 1 wherein the untrusted operating system comprises an operating system signed with a digital signature that identifies a certificate authority that is not among a set of trusted certificate authorities.

* * * * *